United States Patent
Delametter et al.

(10) Patent No.: US 7,857,422 B2
(45) Date of Patent: Dec. 28, 2010

(54) DUAL FEED LIQUID DROP EJECTOR

(75) Inventors: Christopher N. Delametter, Rochester, NY (US); John A. Lebens, Rush, NY (US); David P. Trauernicht, Rochester, NY (US); James M. Chwalek, Pittsford, NY (US); Yonglin Xie, Pittsford, NY (US); Gary A. Kneezel, Webster, NY (US); Christopher R. Morton, Rochester, NY (US); Cathie J. Burke, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 769 days.

(21) Appl. No.: 11/626,965

(22) Filed: Jan. 25, 2007

(65) Prior Publication Data

US 2008/0180485 A1 Jul. 31, 2008

(51) Int. Cl.
*B41J 2/15* (2006.01)
(52) U.S. Cl. ........................................ 347/40
(58) Field of Classification Search .................. 347/47, 347/54, 56, 65, 40
See application file for complete search history.

(56) References Cited

U.S. PATENT DOCUMENTS

| | | | |
|---|---|---|---|
| 6,113,221 A | 9/2000 | Weber | |
| 6,132,033 A | 10/2000 | Browning et al. | |
| 6,162,589 A | 12/2000 | Chen et al. | |
| 6,257,706 B1 * | 7/2001 | Ahn | 347/54 |
| 6,270,192 B1 | 8/2001 | Ma | |
| 6,273,557 B1 | 8/2001 | Milligan et al. | |
| 6,336,714 B1 | 1/2002 | Kawamura et al. | |
| 6,555,480 B2 | 4/2003 | Milligan et al. | |
| 6,582,060 B1 | 6/2003 | Kitakami et al. | |
| 6,676,244 B2 * | 1/2004 | Kwon et al. | 347/45 |
| 6,698,868 B2 | 3/2004 | Trueba et al. | |
| 6,726,308 B2 | 4/2004 | Lee et al. | |
| 6,890,063 B2 | 5/2005 | Kim | |
| 7,175,258 B2 * | 2/2007 | Cabal et al. | 347/54 |
| 7,213,908 B2 * | 5/2007 | Chwalek et al. | 347/65 |
| 2002/0008732 A1 | 1/2002 | Moon et al. | |
| 2002/0012024 A1 | 1/2002 | Lee et al. | |
| 2004/0263578 A1 | 12/2004 | Lee et al. | |
| 2006/0028511 A1 | 2/2006 | Chwalek et al. | |

FOREIGN PATENT DOCUMENTS

EP 1 491 340 12/2004
EP 1 570 992 9/2005

* cited by examiner

*Primary Examiner*—An H Do
(74) *Attorney, Agent, or Firm*—William R. Zimmerli

(57) ABSTRACT

A liquid ejector includes a structure defining a chamber. The chamber includes a first surface and a second surface. The first surface includes a nozzle orifice. A drop forming mechanism is located on the second surface of the chamber opposite the nozzle orifice. A first liquid feed channel and a second liquid feed channel are in fluid communication with the chamber. A first segment of a segmented liquid inlet is in fluid communication with the first liquid feed channel and a second segment of the segmented liquid inlet is in fluid communication with the second liquid feed channel.

39 Claims, 19 Drawing Sheets

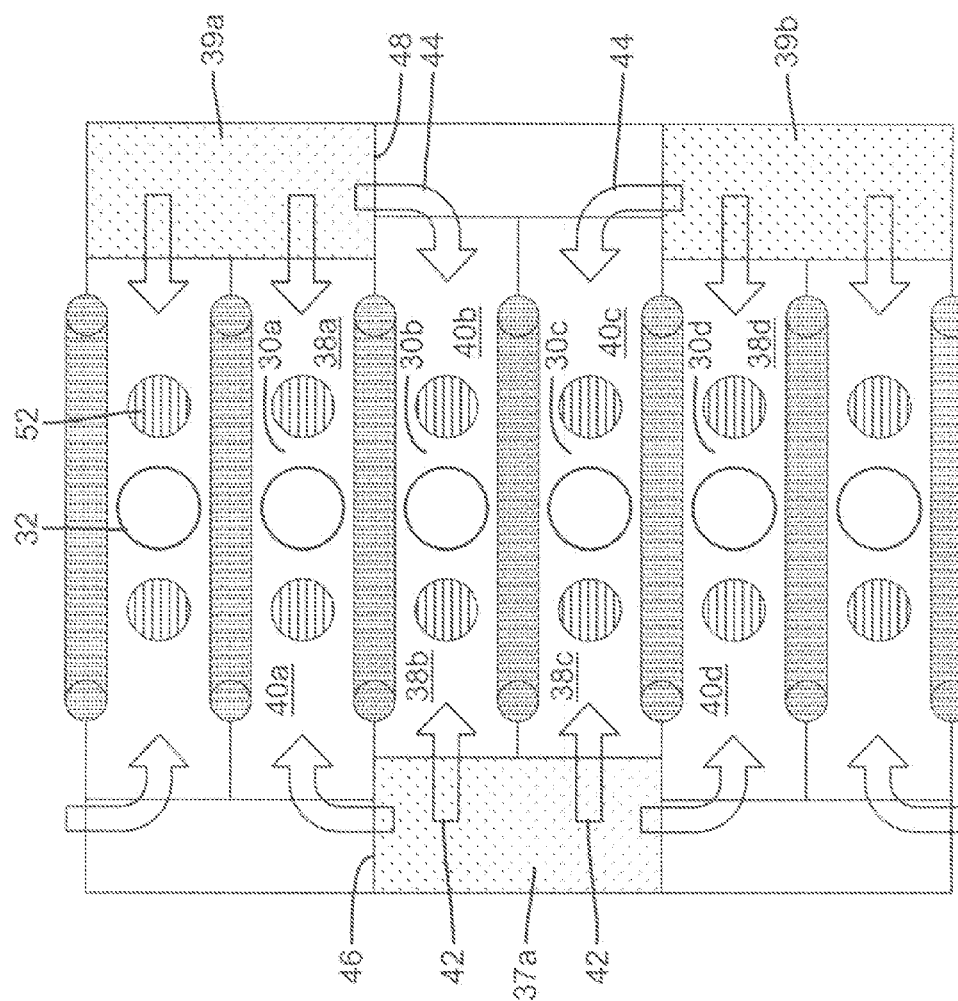

DUAL FEED LIQUID DROP EJECTOR

FIELD OF THE INVENTION

This invention relates generally to the field of digitally controlled printing systems, and in particular to the liquid drop ejector component of these systems.

BACKGROUND OF THE INVENTION

In the field of inkjet printing, there is a desire to provide better quality prints more quickly than can be provided using commercially available printheads. Accordingly, efforts have been made to increase inkjet printhead operating frequencies and improve the placement accuracy of drops ejected from inkjet printheads, see, for example, U.S. patent application Publication No. U.S. 2004/0263578 A1, published on Dec. 30, 2004.

U.S. patent application Publication No. U.S. 2004/0263578 A1 discloses an inkjet printhead that includes a substrate having an ink chamber and a manifold, a nozzle plate formed on the substrate, first and second heaters, first and second conductors, and first and second ink channels. The nozzle plate includes a nozzle passing through the nozzle plate and in flow communication with the ink chamber. The first and second heaters and conductors are interposed between adjacent passivation layers of the nozzle plate. The ink channels are interposed between the ink chamber and the manifold, for providing flow communication between the ink chamber and the manifold. The first and second heaters, conductors and ink channels are symmetric with respect to the nozzle.

Notwithstanding these efforts, there is still a need for liquid drop ejectors that have increased firing frequency and increased accuracy for drop ejection and drop placement on a receiver.

SUMMARY OF THE INVENTION

According to one feature of the present invention, a liquid ejector includes a structure defining a chamber. The chamber includes a first surface and a second surface. The first surface includes a nozzle orifice. A drop forming mechanism is located on the second surface of the chamber opposite the nozzle orifice. A first liquid feed channel and a second liquid feed channel are in fluid communication with the chamber. A first segment of a segmented liquid inlet is in fluid communication with the first liquid feed channel and a second segment of the segmented liquid inlet is in fluid communication with the second liquid feed channel.

According to another feature of the present invention, a liquid ejector includes a structure defining an array of chambers with each chamber having a nozzle orifice. A drop forming mechanism is located in each chamber. First and second liquid feed channels are in fluid communication with each chamber. The first and second feed channels extend in opposite directions from each chamber. A segmented inlet includes a plurality of first segments and a plurality of second segments. Each of the first segments of the liquid inlet is in fluid communication with the first liquid feed channels and each of the second segments of the liquid inlet is in fluid communication with the second liquid feed channels. The plurality of first segments and the plurality of second segments are located on opposite sides of the nozzle orifice.

According to another feature of the present invention, a liquid ejector includes a structure defining a chamber having a nozzle orifice. A drop forming mechanism is located in the chamber. First and second liquid feed channels are in fluid communication with the chamber. A first segment of a segmented liquid inlet is in fluid communication with the first liquid feed channel. A second segment of the segmented liquid inlet is in fluid communication with the second liquid feed channel. The first segment of the liquid inlet and the second segment of the liquid inlet are positioned offset relative to each other as viewed from a plane perpendicular to the nozzle orifice.

BRIEF DESCRIPTION OF THE DRAWINGS

In the detailed description of the preferred embodiments of the invention presented below, reference is made to the accompanying drawings, in which:

FIGS. 2a and 2b are schematic top views of a liquid ejection printhead die incorporating an example embodiment of the present invention in which ends of adjacent inlet segments are aligned;

DETAILED DESCRIPTION OF THE INVENTION

Figure 1:
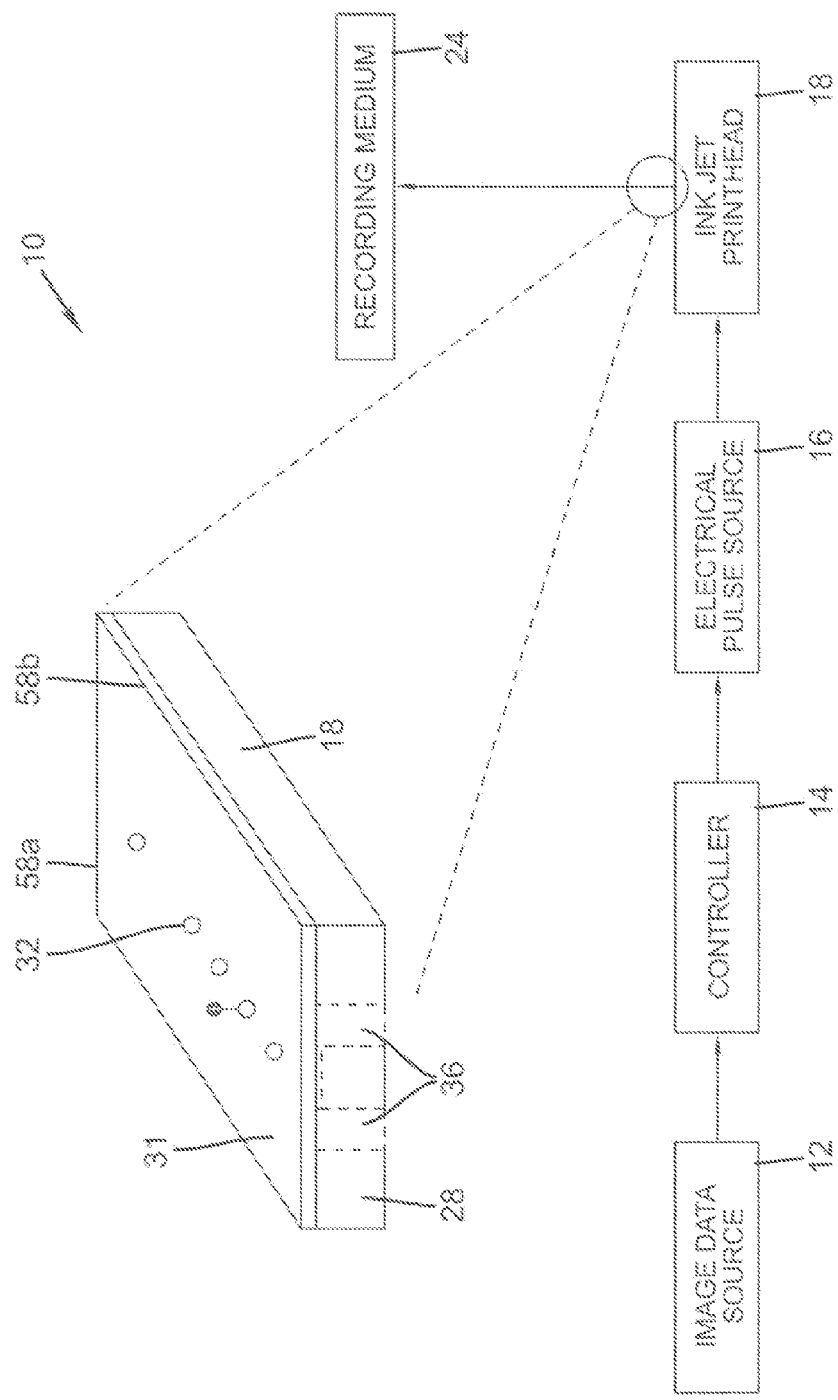
FIG. 1 is a schematic representation of a liquid ejection system incorporating the present invention.

The present description will be directed in particular to elements forming part of, or cooperating more directly with, apparatus in accordance with the present invention. It is to be understood that elements not specifically shown or described may take various forms well known to those skilled in the art. In the following description, identical reference numerals have been used, where possible, to designate identical elements.

Although the term liquid ejection printhead is used herein, it is recognized that printheads are being used today to eject many types of liquids and not just ink. For example, the ejection of various liquids including medicines, pigments, dyes, conductive and semi-conductive organics, metal particles, and other materials is possible today using a liquid ejection printhead. As such, the term printhead is not intended to be limited to just devices that eject ink.

One aspect of the invention described herein relates to the configuration of the liquid ejector and, in particular, the relationship of a drop forming mechanism and its corresponding liquid feed channels. Particular embodiments are described relating to thermal inkjet printheads in which the drop forming mechanism is a resistive heating element that is pulsed to nucleate a bubble in an ink-filled chamber, and eject a droplet as the bubble expands. Other embodiments include piezoelectric printheads, as well as MEMS type printheads, e.g. those in which the drop forming mechanism is a thermal bend actuator or an electrostatic actuator. Preferred fabrication methods include those described in copending applications U.S. Ser. No. 11/609,375, filed Dec. 12, 2006, entitled "LIQUID DROP EJECTOR HAVING IMPROVED LIQUID CHAMBER" in the name of John A. Lebens and U.S. Ser. No. 11/609,365, filed Dec. 12, 2006, entitled "LIQUID EJECTOR HAVING IMPROVED CHAMBER WALLS" in the name of John A. Lebens et al. These applications describe methods for forming chambers and nozzle plates in an integrated fashion with the drop forming mechanism. However, this invention may also be practiced using more conventional fabrication methods, such as forming the nozzle plate as a separate component from the substrate on which the resistive heating elements are formed and then bonding the two components together.

Referring to FIG. 1, a schematic representation of a liquid ejection system 10, for example, an inkjet printer, is shown. Liquid ejection system 10 includes a source 12 of data (for example, image data) which provides signals that are interpreted by a controller 14 as being commands to eject liquid drops. Controller 14 outputs signals to a source 16 of electrical energy pulses which are sent to a liquid ejection printhead die 18. Typically, liquid ejection printhead die 18 includes a plurality of liquid ejectors 20 arranged in at least one array, for example, a substantially linear row. During operation, liquid, for example, ink in the form of ink drops, is deposited on a recording medium 24.

Figure 2A:
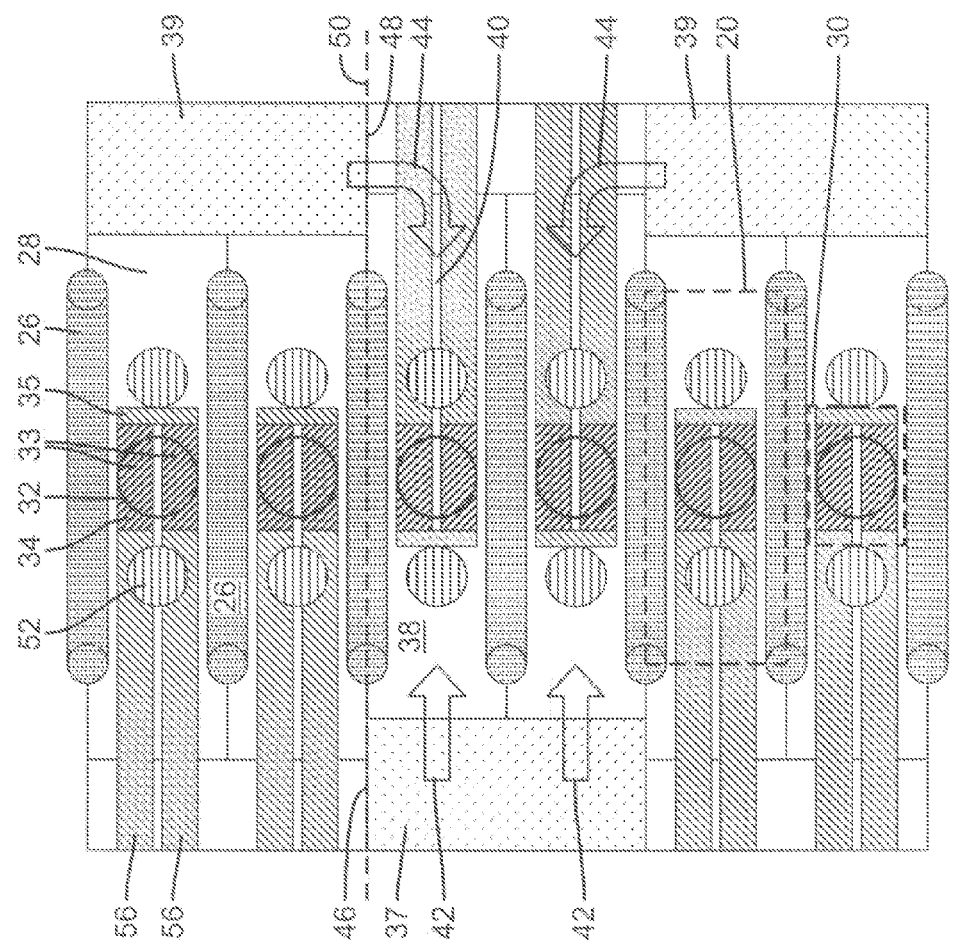

Referring additionally to FIGS. 2a and 2b, a schematic representations of a liquid ejection printhead die 18 are shown. Liquid ejection printhead die 18 includes an array or plurality of liquid ejectors 20. Liquid ejector 20 includes a structure, for example, walls 26 extending from a substrate 28 that define a chamber 30. Walls 26 separate liquid ejectors 20 positioned adjacent to other liquid ejectors 20. Each chamber 30 includes a nozzle orifice 32 in nozzle plate 31 through which liquid is ejected. A drop forming mechanism 34, for example, a resistive heater, is also located in each chamber 30. In FIG. 2a, the resistive heater is positioned on the top surface of substrate 28 in the bottom of chamber 30 and opposite nozzle orifice 32, although other configurations are permitted. In other words, in this embodiment the bottom surface of chamber 30 is the top of substrate 28, and the top surface of the chamber 30 is the nozzle plate 31.

A segmented liquid inlet or manifold 36 supplies liquid to each chamber 30 through first and second liquid feed channels 38 and 40 that are in fluid communication with each chamber 30. Segmented inlet 36 includes a first segment 37 that is in fluid communication with first liquid feed channel 38 and a second segment 39 that is in fluid communication with second liquid feed channel 40. First segments 37 and second segments 39 are positioned on opposite sides of chamber 30 and nozzle orifice 32.

In FIGS. 2a and 2b, each first segment 37 of liquid inlet 36 and each second segment 39 of liquid inlet 36 are positioned offset relative to each other as viewed from a plane perpendicular to a plane including nozzle orifice 32 (the view shown in FIGS. 2a and 2b). Positioning first segment 37 and second segment 39 in this manner enables a segment (either first segment 37 or second segment 39) to provide liquid to chambers 30 that are aligned with the segment (represented by arrows 42) as well as provide liquid to chambers 30 that are offset from the segment (represented by arrows 44). In FIG. 2a, each of first segment 37 and second segment 39 supply liquid to two chambers 30 that are aligned with or located across from each segment. Additionally, each of first segment 37 and second segment 39 supply liquid to chambers 30 on either side of each segment that are offset from or located adjacent to each segment.

The flow patterns of FIG. 2a are further clarified in FIG. 2b, where some structural elements are omitted for simplification. Individual chambers 30a, 30b, 30c and 30d are designated, as are first segment 37a and second segments 39a and 39b of liquid inlet 36. In the description below, we will refer to a liquid feed channel feeding a particular chamber. It should be understood that this means that this channel primarily feeds the specified chamber (typically a nearby neighbor channel). However, the channel also feeds other nearby channels to a lesser extent, depending on flow requirements due to jet firing patterns.

First liquid feed channel 38a feeds chamber 30a from second segment 39a of liquid inlet 36. In addition, second liquid feed channel 40a also feeds chamber 30a from first segment 37a, which is offset from and adjacent to chamber 30a. Both chambers 30b and 30c are fed by first liquid feed channels 38b and 38c respectively from first segment 37a of liquid inlet 36. Chamber 30b is also fed by second liquid feed channel 40b from second segment 39a, while chamber 30c is also fed by second liquid feed channel 40c from second segment 39b. Chamber 30d is fed by first liquid feed channel 38d from second segment 39b, and is also fed by second liquid feed channel 40d from first segment 37a. Each chamber is fed by a first liquid feed channel 38 from a segment of liquid inlet 36 that is directly in line with the chamber, and also by a second liquid feed channel 40 from a segment of liquid feed inlet 36 that is offset somewhat from the chamber.

Figure 3:
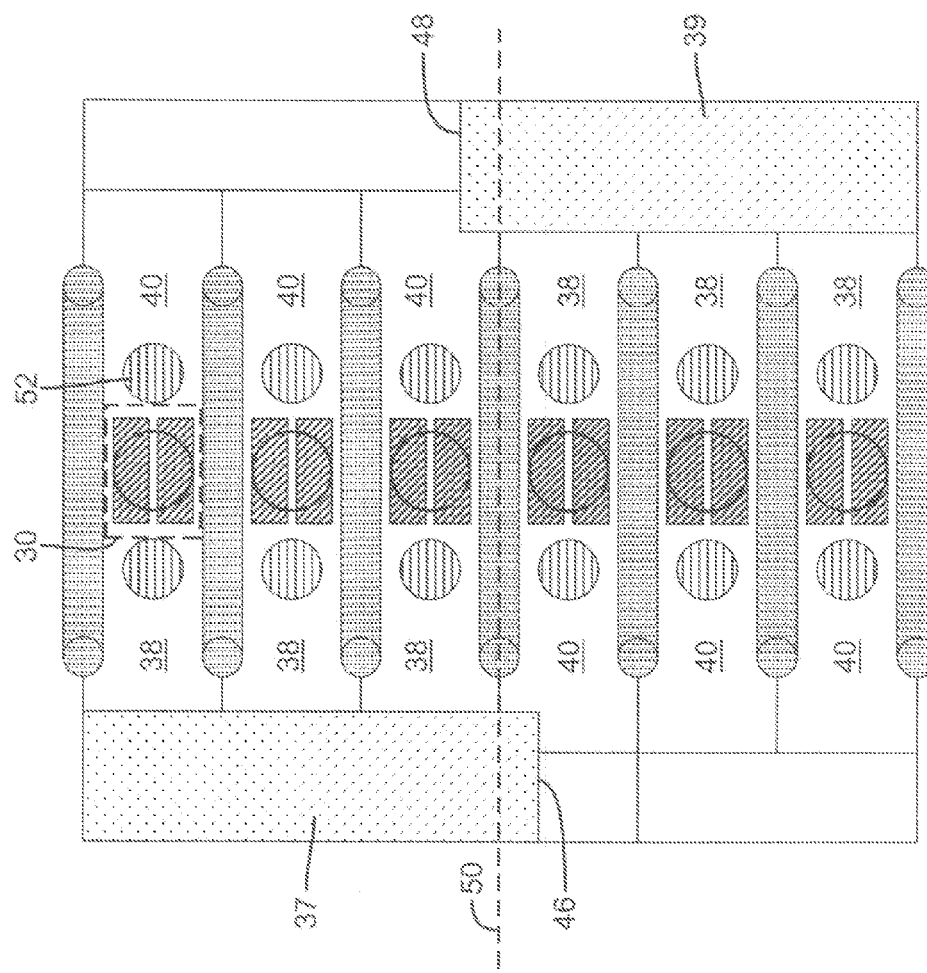
FIG. 3 is a schematic top view of a liquid ejection printhead die incorporating an example embodiment of the present invention in which ends of adjacent inlet segments overlap.

In FIGS. 2a and 2b, segments 37 and 39 of liquid inlet 36 are each approximately as wide as two adjacent chambers, and the spacing between adjacent segments 39a and 39b is also approximately as wide as two adjacent chambers. In other words, two chambers are fed by first liquid feed channels 38 from segments of liquid inlet 36 that are directly in line with the chambers, and the second feed channels 40 for these two chambers are from second segments that are offset somewhat from the chamber. Other configurations are possible. For example, FIG. 3 shows the case of more than two chambers (i.e. 3, 4, or more chambers) being fed by first liquid feed channels 38 from segments of liquid inlet 36 that are directly in line with the chambers, and also by second liquid feed channels 40 from segments of liquid inlet 36 that are somewhat offset from the chambers.

Each of first segment 37 of the liquid inlet 36 includes ends 46 that are adjacent to ends 48 of each second segment 39 of liquid inlet 38. In FIG. 2a, an end 46 of first segment 37 is aligned with an end 48 of second segment 39 represented by dashed line 50. However, other configurations are permitted. For example, ends 46 and 48 can overlap each other as is shown in FIG. 3. Alternatively, ends 46 and 48 can be positioned spaced apart from each other as is shown in FIG. 4.

One or more posts 52 can be disposed in chamber 30, liquid feed channel 38, liquid feed channel 40, or combinations thereof. As discussed in more detail below, posts 52 can be symmetrically or asymmetrically disposed about the nozzle orifice 32 and/or within one or both of liquid feed channels 38, 40. Posts 52 can have the same cross sectional area or different cross sectional areas when compared to each other. Posts 52 can also have same shapes or different shapes when compared to each other.

Figure 4:
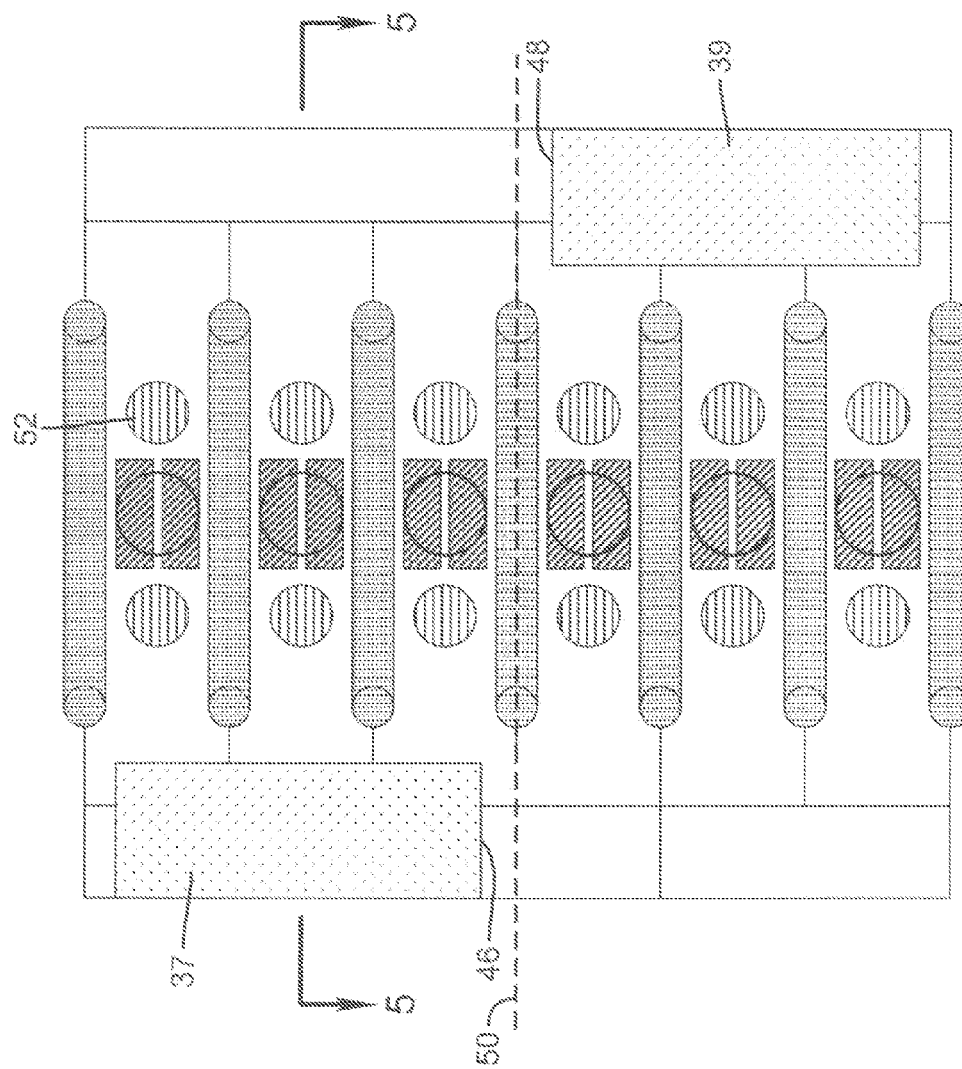
FIG. 4 is a schematic top view of a liquid ejection printhead die incorporating an example embodiment of the present invention in which ends of adjacent inlet segments are spaced apart.
Figure 5:
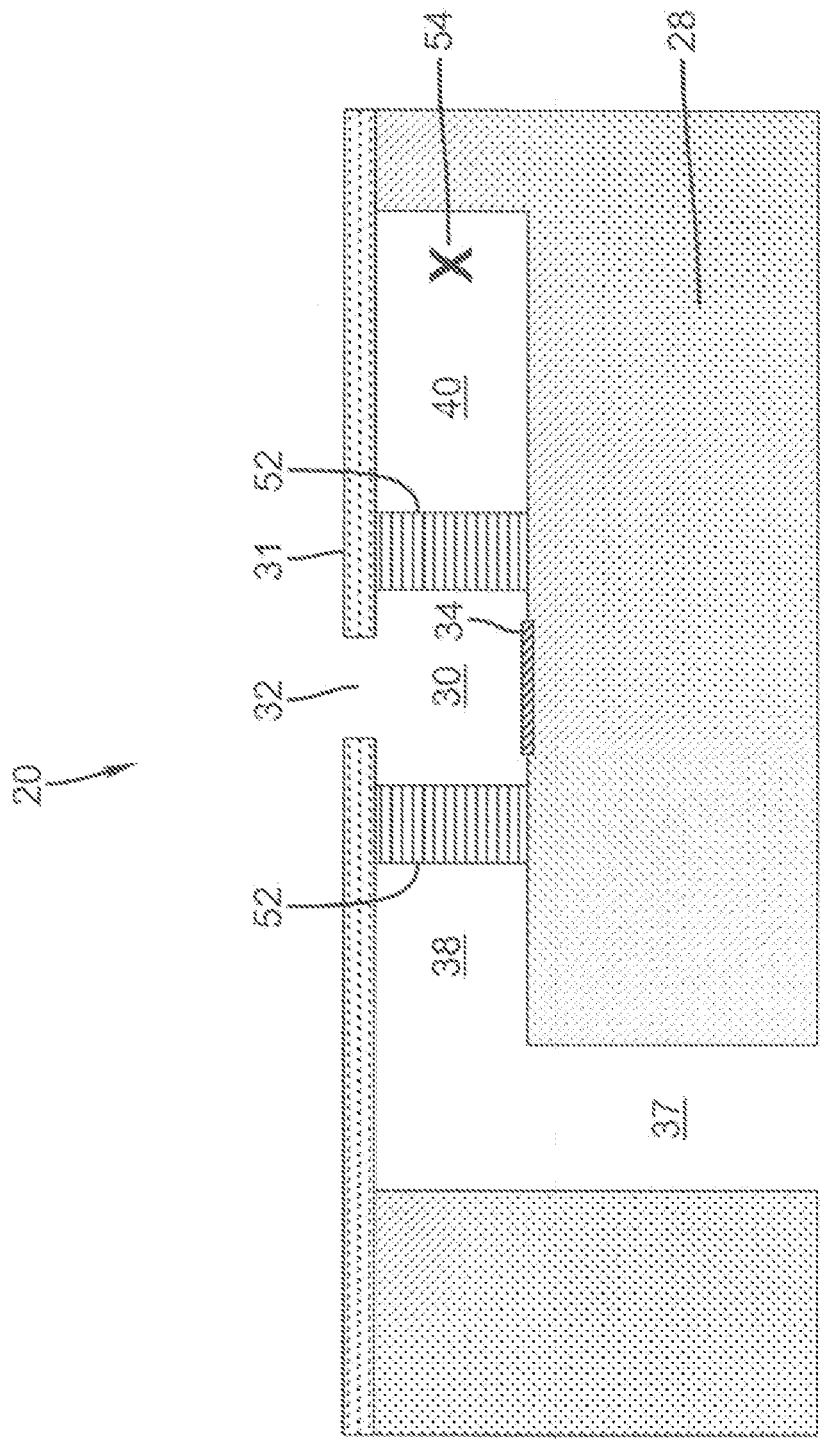
FIG. 5 is a schematic cross sectional view of one liquid ejector shown through line 5-5 of FIG. 4.

Referring to FIG. 5, a schematic cross sectional view of one liquid ejector 20 is shown through line 5-5 of FIG. 4. Liquid ejector 20 includes chamber 30 connected in fluid communication with first liquid feed channel 38 which is connected in fluid communication to one of a plurality of first segments 37 of segmented liquid inlet or manifold 36. Chamber 30 is also connected in fluid communication with second liquid feed channel 40 which is connected in fluid communication to one of a plurality of second segments 39 of segmented liquid inlet or manifold 36. In FIG. 5, first segment 37 of liquid inlet 36 is aligned with chamber 30 and supplies liquid directly to chamber 30. Second segment 39 of liquid inlet 36 is offset relative to chamber 30 and supplies liquid indirectly to chamber 30 (represented by "X" 54).

Drop forming mechanism 34, for example, a resistive heater, is located in chamber 30 and is operable to eject liquid through nozzle orifice 32. Posts 52 are also present in chamber 30 and/or one or both of first and second liquid feed channels 38 and 40.

Having described the basic components of the liquid ejector, we will now review the operation of the liquid ejector, as embodied in a thermal inkjet printhead, so that the advantages and reasons for those advantages become more apparent. This discussion will also help to establish the context for design variations described below.

Referring back to FIGS. 1-5, ink enters the printhead die through segmented liquid inlet 36 and passes through first and second liquid feed channels 38 and 40 from opposite directions to enter the fluid chamber 30. In a conventional thermal inkjet printhead, the chamber is filled with ink through a single liquid feed channel from only one direction.

When the chamber is filled with ink, the resistive heating element 34, which is positioned below the nozzle orifice 32, is in thermal contact with the pool of ink in the chamber. Resistive heating element 34 is shown in a particular configuration including two parallel legs 33 of resistive material, joined at one end by a conductive shorting bar 35. Electrical leads 56 are connected to each leg 33 at the opposite end from the shorting bar 35. However, other resistive heating element configurations are possible.

When data source 12 provides a signal that is interpreted by controller 14 as a command for a drop of ink to be ejected from a particular chamber 30 at a particular time, source 16 provides an electrical pulse to heater 34 through electrical leads 56. The pulse voltage is chosen such that a bubble is nucleated in the superheated ink over the heater.

As the bubble grows, it pushes the ink above it out through nozzle orifice 32, thus ejecting a drop. The size of the droplet (i.e. its volume or mass, and related to the size of the dot produced on recording medium 24) is determined primarily by size of the heater 34, size of the nozzle 32, and geometry of the chamber 30, and to a lesser extent on ink temperature and pulse configuration.

For accurate firing of jets, it is preferable for the droplet to be ejected at a velocity of approximately 10 to 20 meters per second, depending somewhat on the size of the droplet. In order to increase the drop velocity (and increase the energy efficiency, which is the energy of the drop divided by the energy input into the resistive heating element), it is helpful to preferentially direct the expansion of the bubble toward the nozzle. This is one of the functions of posts 52, which act as a source of lateral fluid impedance, so that a greater amount of the bubble expansion is directed toward the nozzle orifice 32.

Posts 52 also restrict the amount and momentum of liquid flow away from chamber 30, so that the refill of the chamber 30 is able to occur more quickly. Refill of chamber 30 is typically the rate limiting step for how quickly the same chamber can be fired again. After the drop is ejected, liquid feeds in from inlet 36 through liquid feed channels 38 and 40 and into the chamber. The dual feed configuration of the invention increases refill rate (and hence printing throughput speeds) for several reasons. As mentioned above, posts 52 restrict the backflow of ink so that the reversal of ink flow can happen more quickly. Another important factor promoting faster refill is the existence of two feed channels 38 and 40 rather than a single feed channel, thereby increasing the rate of flow of ink back into the chamber. In addition, compared to conventional liquid ejectors, which are fed from one side of the chamber, but have a fluidic dead-end at the opposite side of the chamber, the liquid ejector 20 described herein is fed from two opposite sides of the chamber. As a result, the ink-air interface possesses symmetric curvature relative to the chamber during refill, which enhances the pressure differences that drive refill, so that refill occurs more rapidly. Computer simulations of flow for the dual feed configuration indicate that refill rate is approximately twice as high as for a comparable single feed configuration.

Figure 6:
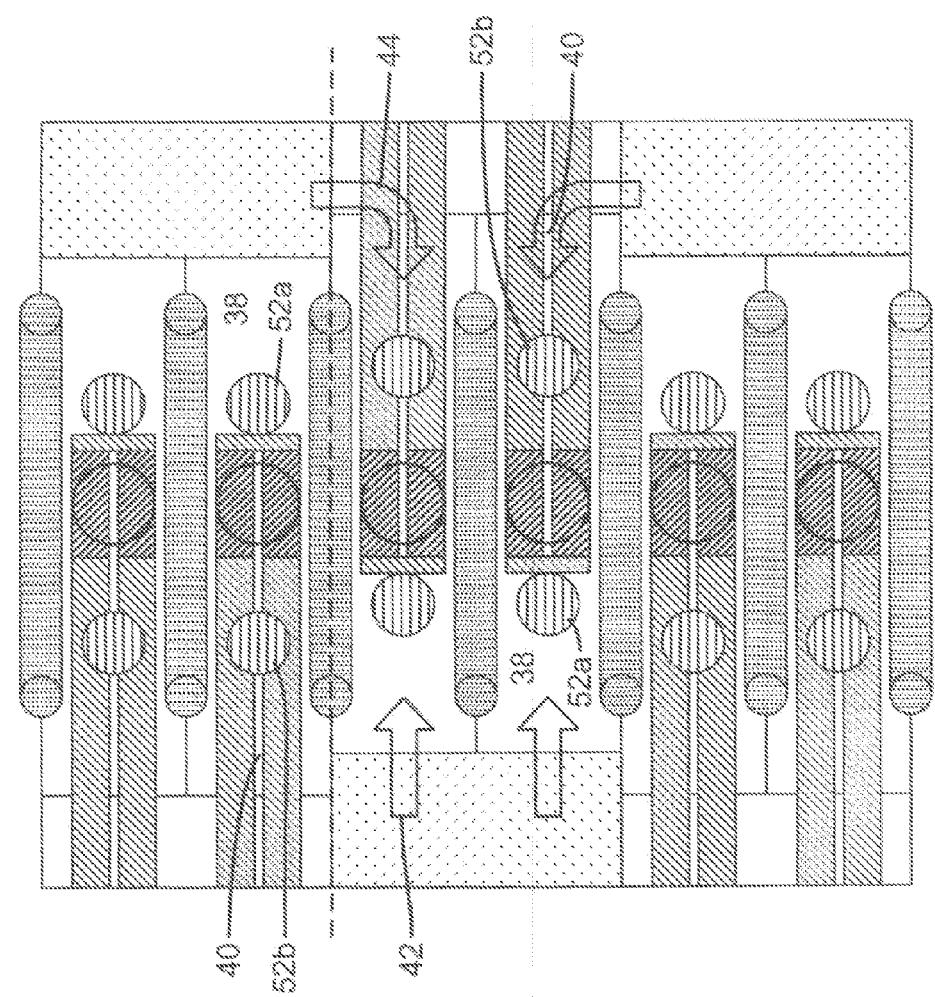
FIG. 6 is a schematic top view of a liquid ejection printhead die incorporating an example embodiment of the present invention in which the posts are asymmetrically positioned within the feed channels.
Figure 7:
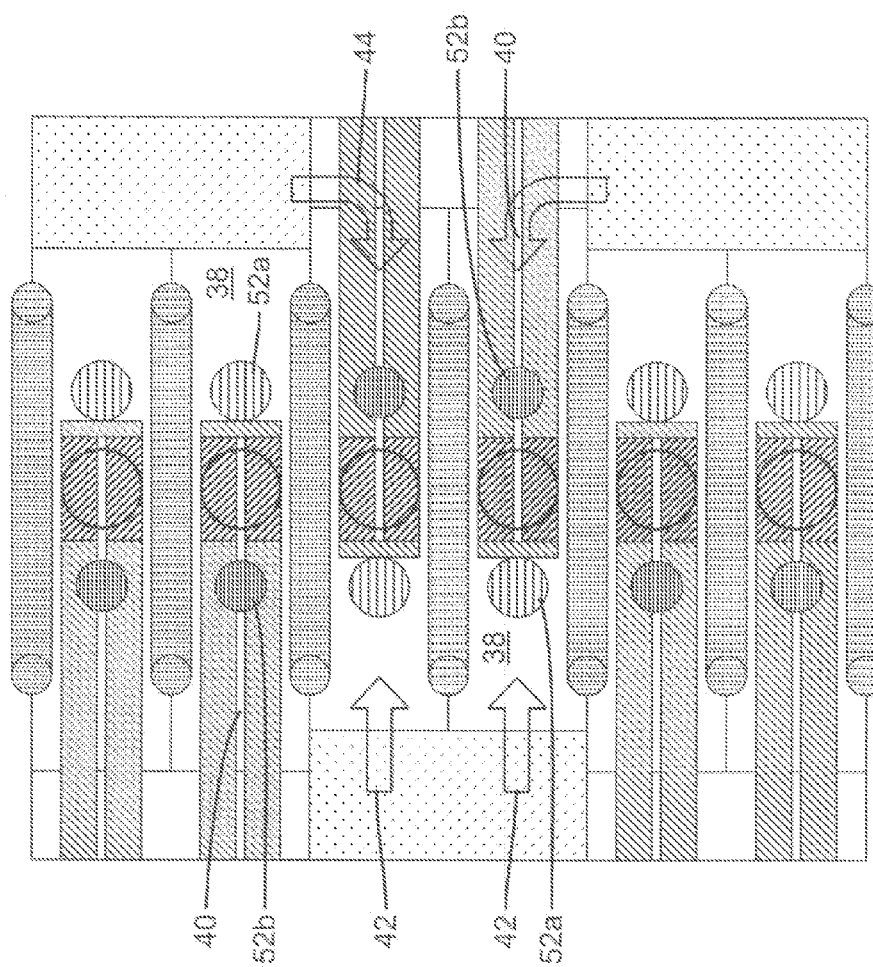
FIG. 7 is a schematic top view of a liquid ejection printhead die incorporating an example embodiment of the present invention in which the posts have different cross-sectional areas.

As can be seen in FIGS. 2a and 2b, first segment 37 of segmented inlet 36 feeds liquid feed channel 38 which is directly in front of first segment 37. Second segment 39 feeds liquid feed channel 40 which is offset from second segment 39. Due to the different fluid path lengths, there is a difference between fluid impedances from segment 37 and feed channel 38 to chamber 30, as compared with the fluid impedance from segment 39 and fluid channel 40. Therefore, in some embodiments the position or cross-sectional area of one or more posts may be modified to compensate for this difference in fluid impedance. For example, in FIG. 6, post 52b in feed channel 40 is moved further away from nozzle orifice 32 than post 52a is in feed channel 38. Similarly, in FIG. 7, post 52b in feed channel 40 is formed with a smaller cross-sectional area than post 52a in feed channel 38. FIGS. 6 and 7 show all posts 52a in feed channels 38 being located similarly to one another and with a first same cross-sectional area, and similarly all posts 52b in feed channels 40 being located similarly to one another and with a second same cross-sectional area. However, it may be understood, particularly for liquid inlet 36 configurations similar to that shown in FIG. 3, where more than 2 chambers are somewhat offset from the corresponding segment, that it may be advantageous for some posts 52b in feed channels 40 to be sized or positioned differently from other posts 52b in other feed channels 40, for example. A different cross-sectional shape is permitted. In other embodiments, the posts 52 may be symmetrically positioned about the nozzle orifice and may have the same cross-sectional area as each other (as shown in FIGS. 2a and 2b).

Figure 8:
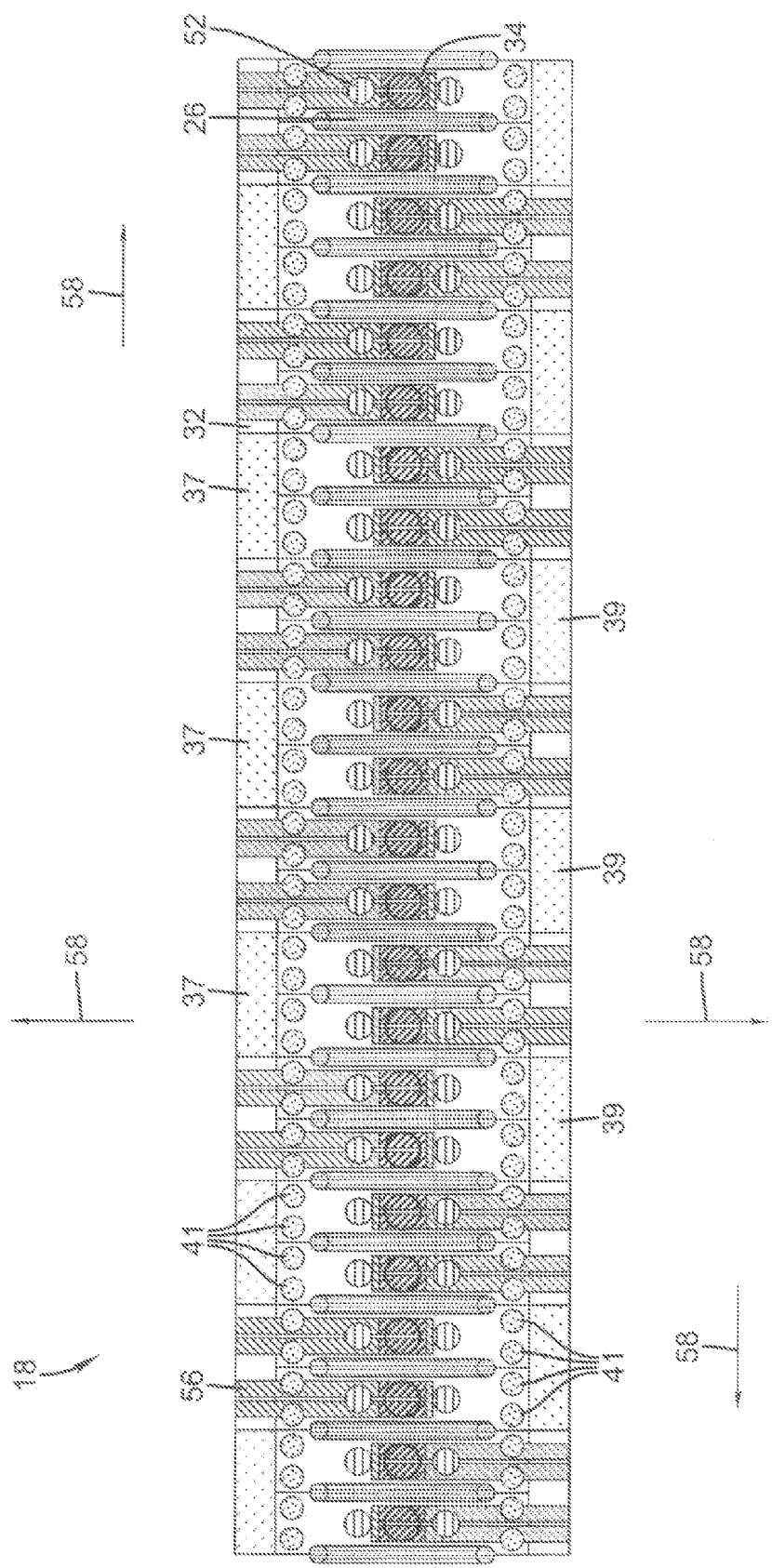
FIG. 8 is a lower magnification of a portion of a liquid ejection printhead die incorporating an example embodiment of the present invention in which additional posts are disposed between the inlet segments and the feed channels.

A lower magnification top view of a portion of liquid ejection printhead die 18 is shown in FIG. 8. The twenty-four chambers shown in FIG. 8 are fed by a liquid inlet 36 consisting of six segments 37 on one side of the chambers and six segments 39, which are offset from segments 37, on the other side of the chambers. A typical liquid ejection printhead die would typically have hundreds or even thousands of chambers and corresponding segments 37 and 39 of liquid feed inlet 36. FIG. 8 contains other elements similar to FIG. 2a, including walls 26, nozzle orifices 32, resistive heating elements 34, electrical leads 56, and posts 52. In addition, FIG. 8 shows optional filter posts 41 located between segments 37, 39 of liquid inlet 36 and the nozzle orifices 32, i.e. within the respective liquid feed channels 38 and 40. Filter posts 41 block particulates from clogging the chamber at post 52 or nozzle 32. Even if a particle is caught between two adjacent filter posts, there are many parallel redundant fluid paths around the line of filter posts, so that all chambers would continue to be supplied with ink.

As shown in FIG. 8, liquid inlet 36 may be formed through substrate 28 such that first segments 37 and second segments 39 are relatively close to nozzle orifices 32. However, it is necessary to bring electrical leads toward an edge 58 of the printhead die, such as edge 58a or 58b shown in FIG. 1. Typically one or more rows of bond pads (not shown) are provided along one or more edges 58, so that electrical interconnection may be made from liquid ejection printhead die 18 and electrical pulse source 16. As shown in FIG. 8, at least one electrical lead 56 extends from each drop forming mechanism 34 toward an edge 58 of printhead die 18. Further, at least one of the electrical leads 56 is positioned between either neighboring segments of first segments 37 or second segments 39. In FIG. 8, some electrical leads 56 are positioned between neighboring first segments 37, while other electrical leads 56 are positioned between neighboring second segments 39 of liquid inlet 36.

Figure 9:
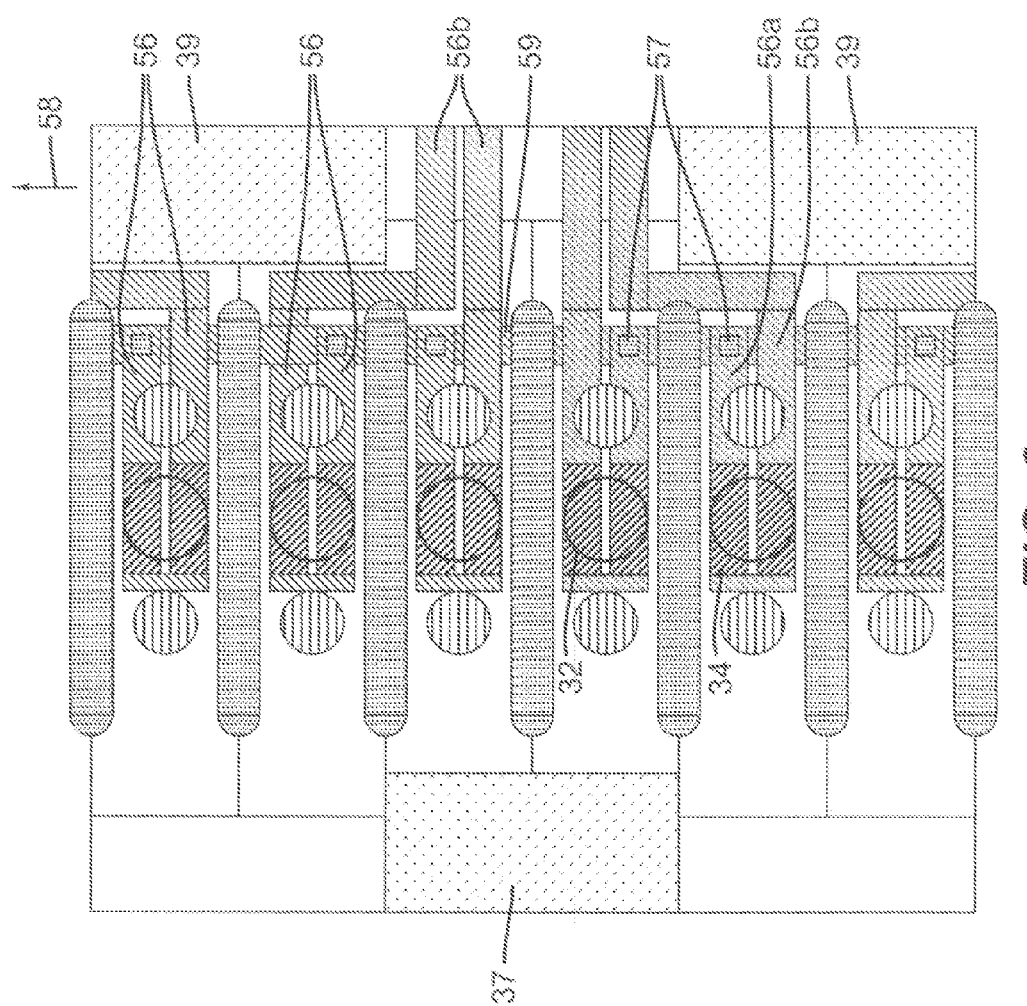
FIG. 9 is a schematic top view of a liquid ejection printhead die incorporating an example embodiment of the present invention in which none of the electrical leads extend toward a plurality of inlet segments.

Offsetting first and second segments 37 and 39 provides more room to position the electrical leads while still providing sufficient liquid refill of chamber 30. Accordingly, it is possible to locate each electrical lead 56 such that none of the electrical leads 56 extend toward first segments 37 as shown in FIG. 9. Alternatively it is possible to locate each electrical lead 56 such that none of the electrical leads 56 extend toward second segments 39 (not shown). At least one of electrical leads 56 can be positioned between neighboring segments 37 and/or 39 as is shown in FIG. 9.

Figure 10:
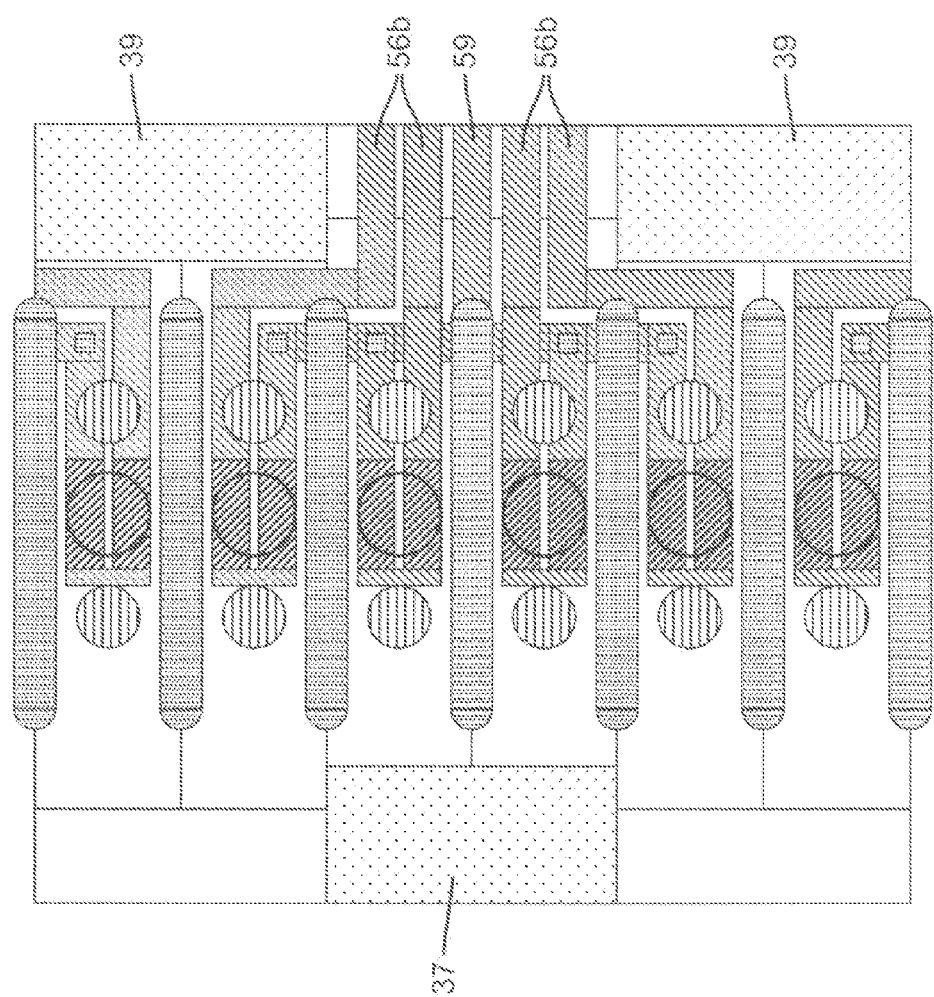
FIG. 10 is a schematic top view of a liquid ejection printhead die incorporating another example embodiment of the present invention in which none of the electrical leads extend toward a plurality of inlet segments.

Each resistive heating element 34 is connected to two electrical leads 56a and 56b. Leads 56a may, for example, be ultimately connected to a constant voltage, while leads 56b may, for example, be connected to individual switches which are addressed by electrical pulse source 16, and optionally controlled by logic circuitry on liquid ejection printhead die 18. In order to reduce the number of leads which need to be positioned between neighboring segments 39 in the embodiment illustrated in FIG. 9, each of the leads 56a are connected by vias 57 to common lead 59 which runs parallel to the segments 39, rather than passing between adjacent segments 39 of liquid inlet 36. Via 57 is located between nozzle orifice 32 and inlet segments 39. Common lead 59 is typically formed on a different metal layer than leads 56b, and common lead 59 is electrically insulated from leads 56b where it crosses over them. Common lead 59 may extend all the way to the printhead die edge 58 which is at the end of the array of nozzle orifices 32 without going between adjacent segments 39. Alternatively, as shown in FIG. 10, several leads 56a may be connected at vias 57 to a common lead 59 which passes between adjacent segments 39. In the embodiment shown in FIG. 9, four leads 56b pass between adjacent segments 39, while in the embodiment shown in FIG. 10, four leads 56b plus common lead 59 pass between adjacent segments 39.

Figure 11:
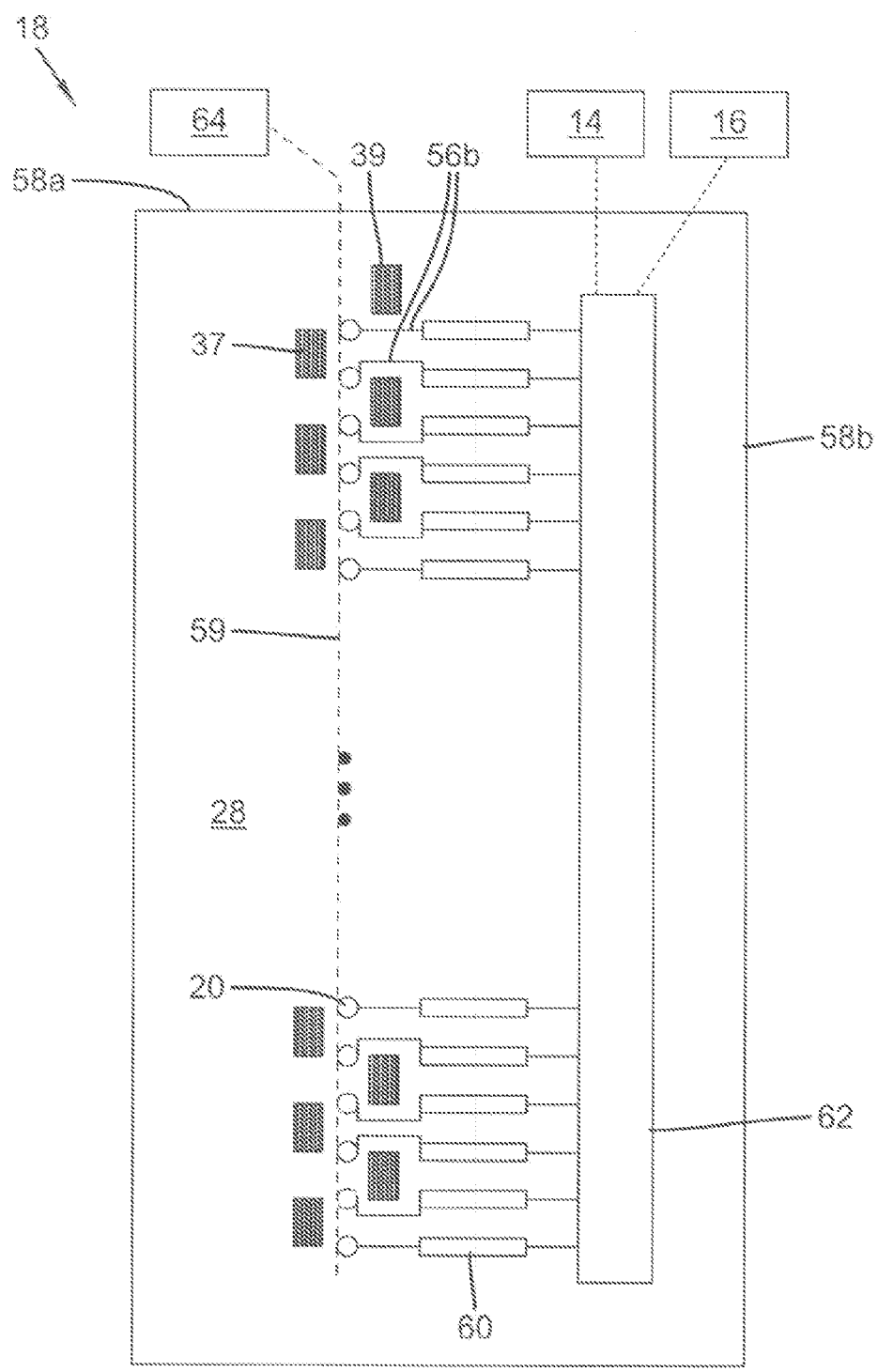
FIG. 11 is a schematic top view of a liquid ejection printhead die incorporating an example embodiment of the present invention in which power circuitry and logic circuitry are integrated on the printhead die.

FIG. 11 schematically illustrates a liquid ejector printhead die 18 in which power circuitry and logic circuitry are integrated together on the same substrate 28 as the liquid ejectors 20. The power circuitry is illustrated as an array of driver transistors 60 which function as switches to allow the resistive heating elements 34 to be activated. For simplicity in FIG. 11, the resistive heating elements (located below orifices 32) are not shown, but it is to be understood that the electrical leads 56b extend from the driver transistors to the respective resistive heating elements 34, and not to the orifices 32. The driver transistors 60 are controlled by logic circuitry 62 integrated on liquid ejector printhead die 18, in order to minimize the number of electrical interconnections (for example at printhead die edge 58a) made to electrical circuitry such as pulse source 16 and controller 14. Logic circuitry 62 typically includes circuit elements such as shift registers, so that data may be shifted serially into liquid ejector printhead die 18, rather than requiring separate interconnections to printhead die 18 for each transistor. Voltage 64 is connected to common leads 59, which are not individually shown, but are represented by the dashed line.

In the embodiment shown in FIG. 11, only two leads 56b are shown passing between adjacent segments 39 of liquid inlet 36. This may be understood as representing all of the leads 56b which pass between adjacent segments 39 to driver transistors 60. Driver transistors 60 are located on the side of segments 39 which is opposite the nozzle orifice side of segment 39. However, the drivers may instead be located near first segments 37 rather than near second segments 39. Logic circuitry 62 will typically be located on the side of driver transistors 60 which is opposite from the nozzle orifice side of driver transistors 60.

Figure 12:
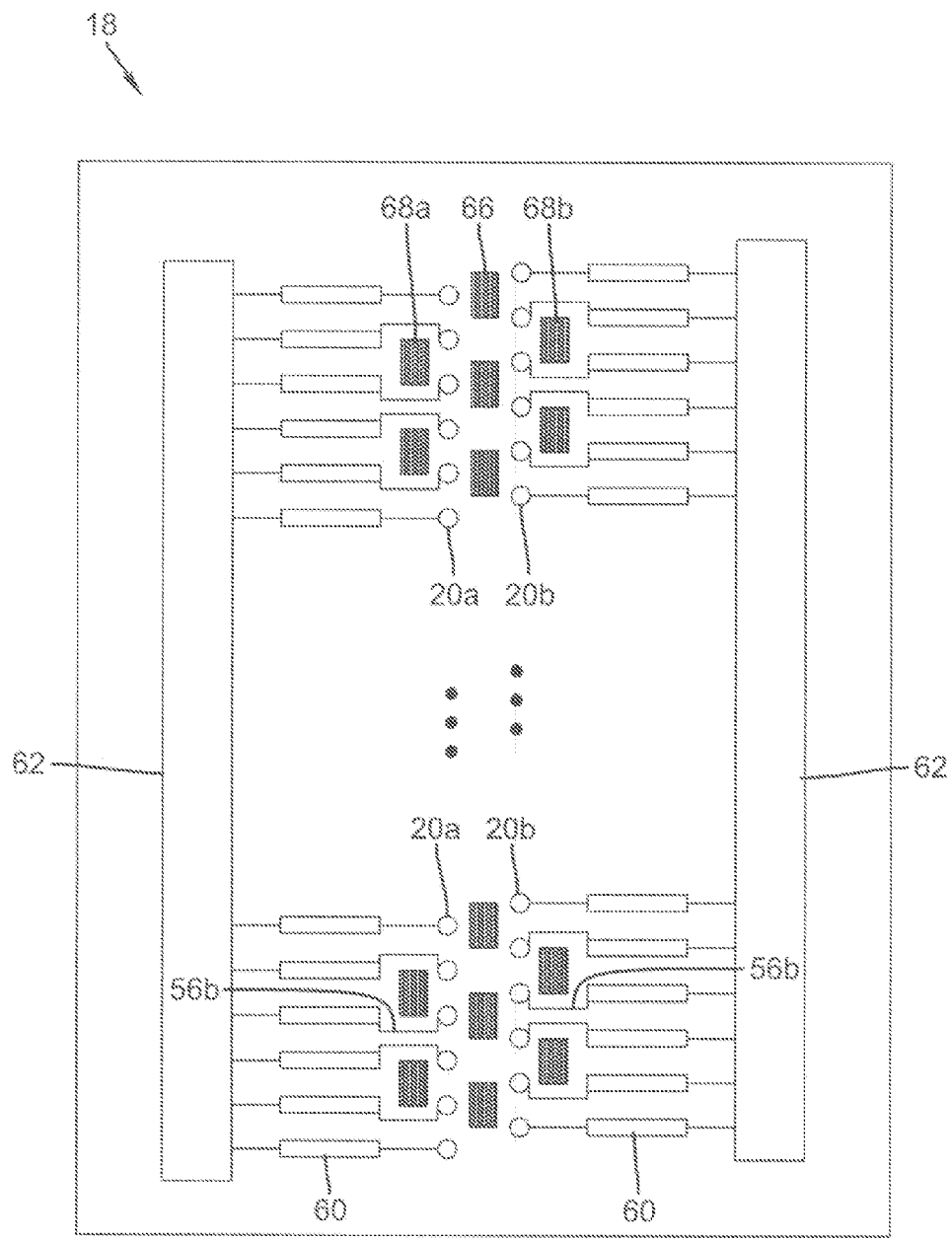
FIG. 12 is a schematic top view of a liquid ejection printhead die incorporating another example embodiment of the present invention in which power circuitry and logic circuitry are integrated on the printhead die.

FIG. 12 schematically illustrates a liquid ejector printhead die 18 having two rows of liquid ejectors 20a and 20b forming a two dimensional array of chambers and orifices. In this embodiment, segmented liquid inlet 36 is composed of three rows of segments. A central row of segments 66 is positioned between the two rows of liquid ejectors 20a and 20b, and feeds liquid ejectors in both rows. In addition, two outer rows of segments 68a and 68b are positioned on the opposite sides of liquid ejectors 20a and 20b respectively, relative to central row of segments 66. Driver transistors 60 and logic circuitry 62 are also shown corresponding to both rows of liquid ejectors 20a and 20b. At least one electrical lead 56b is positioned between neighboring segments 68a (and similarly for neighboring segments 68b) in order to provide electrical connection between ejector 20 and corresponding driver transistor 60. Inlet segments 68a are positioned between ejectors 20a and corresponding driver transistors 60. Similarly, inlet segments 68b are positioned between ejectors 20b and corresponding driver transistors 60. Such a configuration of segmented liquid inlet 36 enables a higher density of liquid ejectors 20 to be provided, where each of the liquid ejectors is fed from two segments in two different directions (analogous to the previous dual-fed embodiments for only a single row of liquid ejectors 20).

Figure 13:
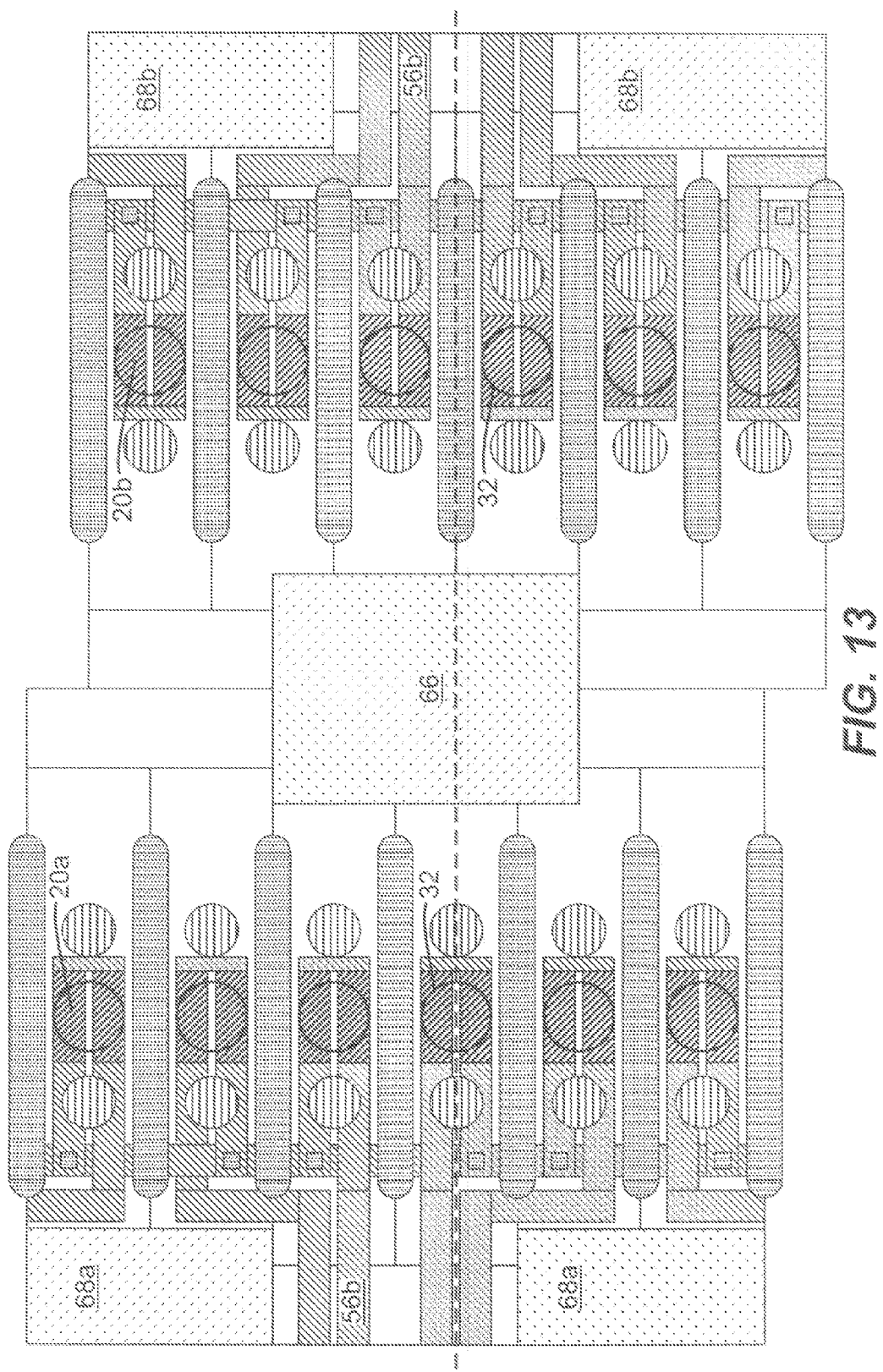
FIG. 13 is a schematic top view of a liquid ejection printhead die incorporating an example embodiment of the present invention including two staggered rows of liquid ejectors.

FIGS. 12 and 13 illustrate one embodiment of a two dimensional array of dual fed liquid ejectors. Here the nozzle orifices 32 corresponding to liquid ejectors 20a are offset by half a nozzle spacing from the nozzle orifices 32 corresponding to liquid ejectors 20b (as seen by nozzle position relative to the dashed line). As a result of the two staggered rows, such a liquid ejection printhead die 18 has twice the effective printing resolution as a printhead die with a single row of liquid ejectors 20. For example, if rows of liquid ejectors 20a and 20b are each at spacings of 600 nozzles per inch, the composite printing resolution would be 1200 spots per inch.

Figure 14:
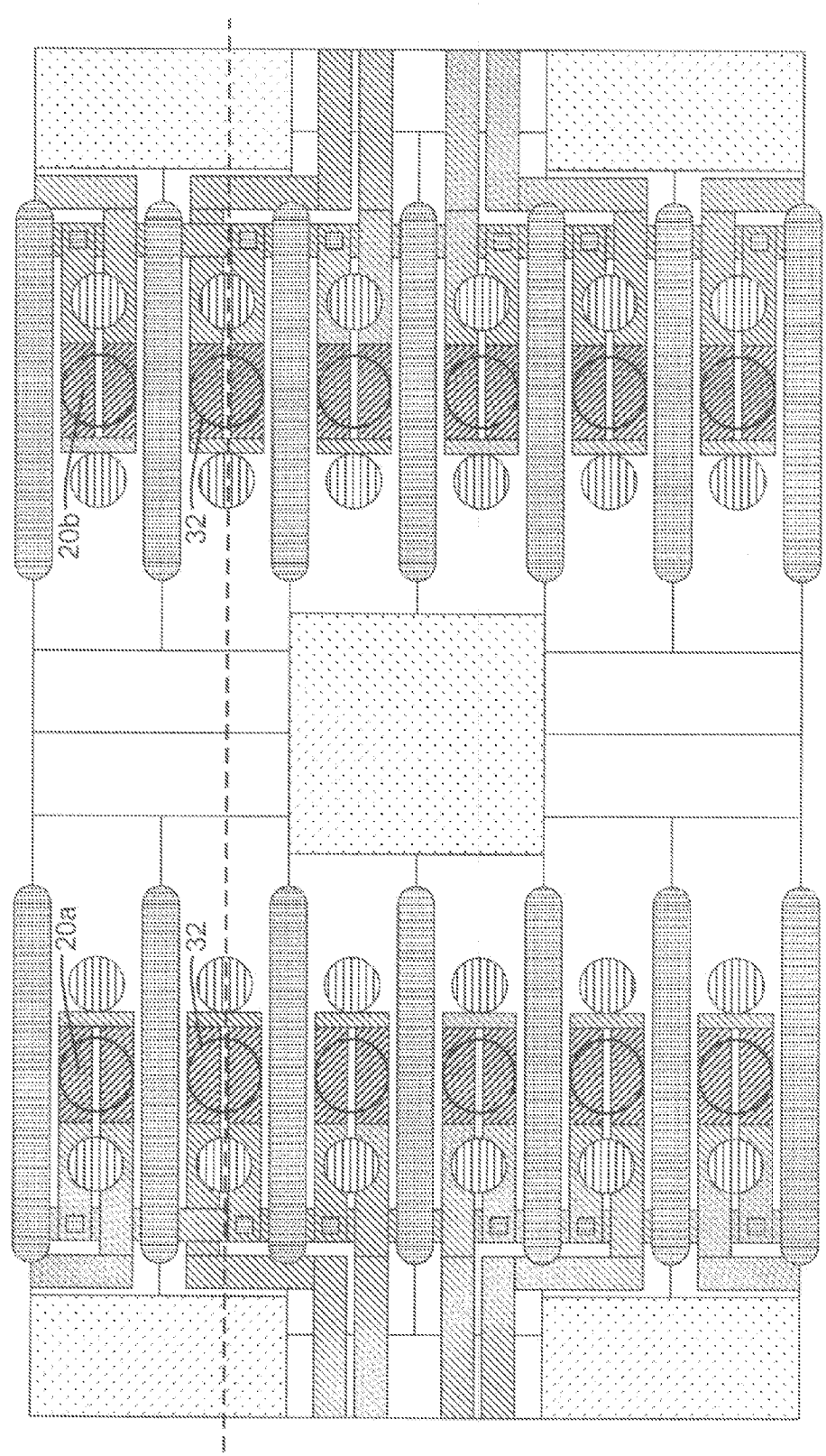
FIG. 14 is a schematic top view of a liquid ejection printhead die incorporating an example embodiment of the present invention including two aligned rows of liquid ejectors.

FIG. 14 illustrates a second embodiment of a two-dimensional array of dual fed liquid ejectors. Here the nozzle orifices 32 corresponding to liquid ejectors 20a are in line with nozzle orifices 32 corresponding to liquid ejectors 20b. This configuration provides redundant nozzles at each pixel location, so that if one drop ejector 20a fails, the corresponding drop ejector 20a may still be used to print a pixel. Rows of aligned nozzles can also be used to increase the printing frequency.

In FIGS. 13 and 14, segments 66 in the central row of liquid inlet 36 are shown as having a larger cross-sectional area than segments 68 in the outer rows of liquid inlet 36. This helps to provide the required fluid flow for feeding both liquid drop ejectors 20a and 20b on either side of central row 66.

Figure 18:
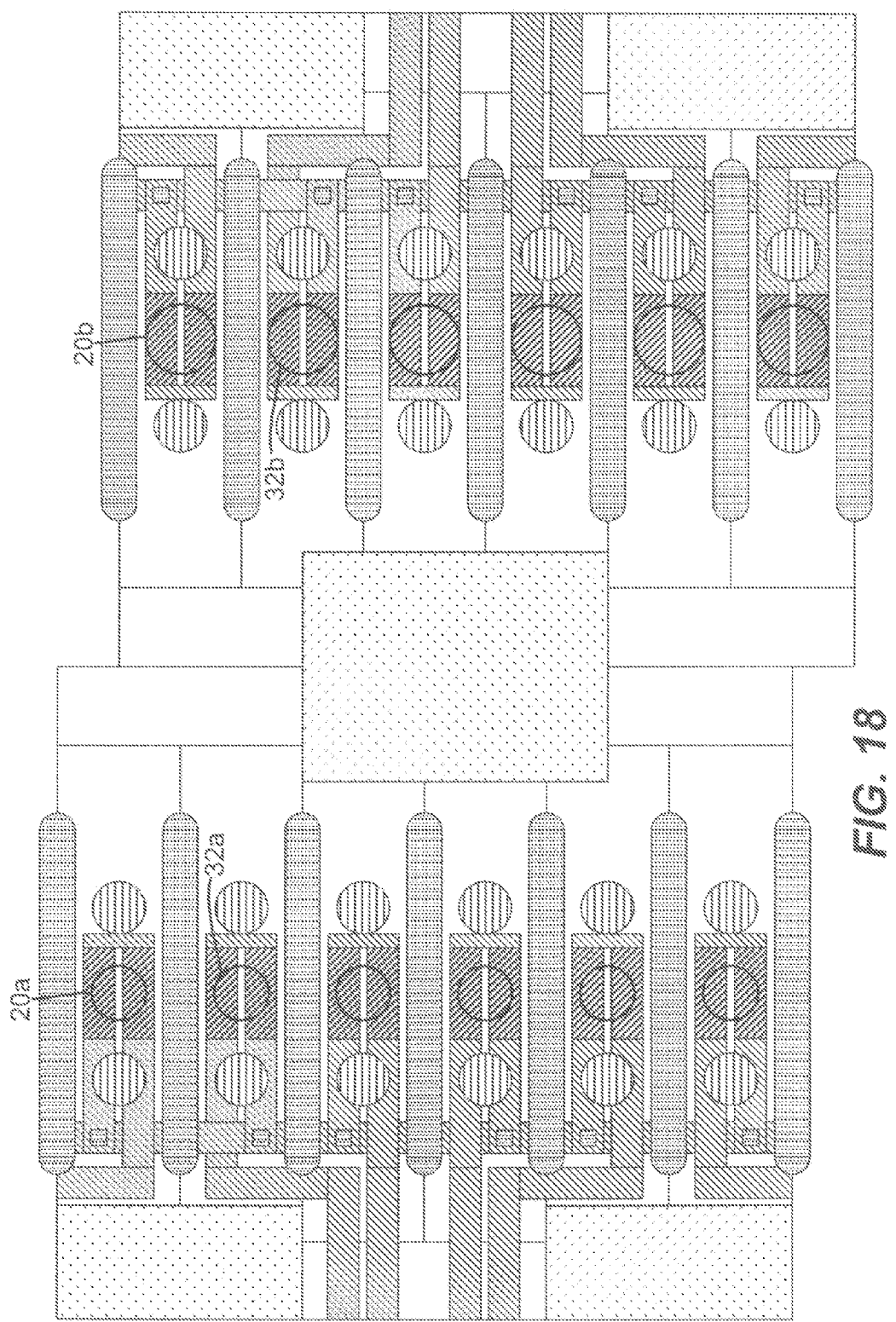
FIG. 18 is a schematic top view of a liquid ejection printhead die incorporating an example embodiment of the present invention including two staggered rows of liquid ejectors where the nozzle cross-sectional area is different in the two rows.

For either the case of staggered rows or aligned rows of liquid ejectors 20, it is also possible to configure chambers 30, heaters 34, and nozzles 32 such that different sized drops are ejected from liquid ejectors 20b relative to 20a. For example, the nozzle orifices corresponding to the different drop sizes would have different cross-sectional areas. FIG. 18 illustrates an embodiment where two rows of liquid ejectors 20 are staggered, and where nozzle orifices 32a of liquid ejectors 20a have a smaller cross-sectional area than nozzle orifices 32b of liquid ejectors 20b. The two different sized drops would provide a level of gray scale printing.

For the embodiments discussed in detail up to this point, the number of segments in segmented inlet 36 has been configured to be fewer than the total number of liquid ejectors 20. For many sizes of inlet segments and spacings of liquid ejectors, providing approximately twice as many liquid ejectors as inlet segments provides an adequate balance between the requirements of providing improved liquid flow to the ejector for faster refill and printing throughput, and routing all electrical leads 56 from the ejector region toward an edge 58 of the printhead die 18. However, for configurations in which the inlet segments can be made small enough relative to the ejector spacing and the width and spacing of electrical leads 56, it may be advantageous to have more than one inlet segment for every two liquid ejectors 20.

Figure 15:
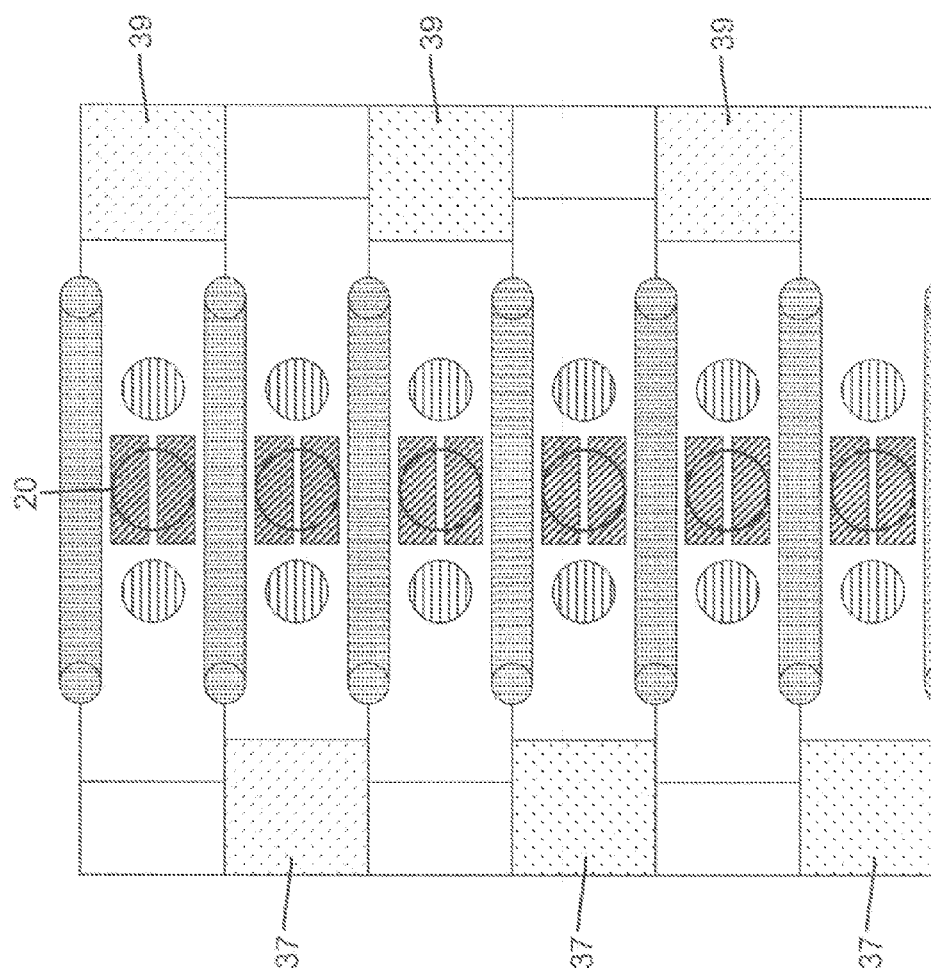
FIGS. 15-17 are schematic top views of liquid ejection printhead die incorporating example embodiments of the present invention in which the ratio of the number of liquid ejectors to the number of inlet segments is less than two.
Figure 16:
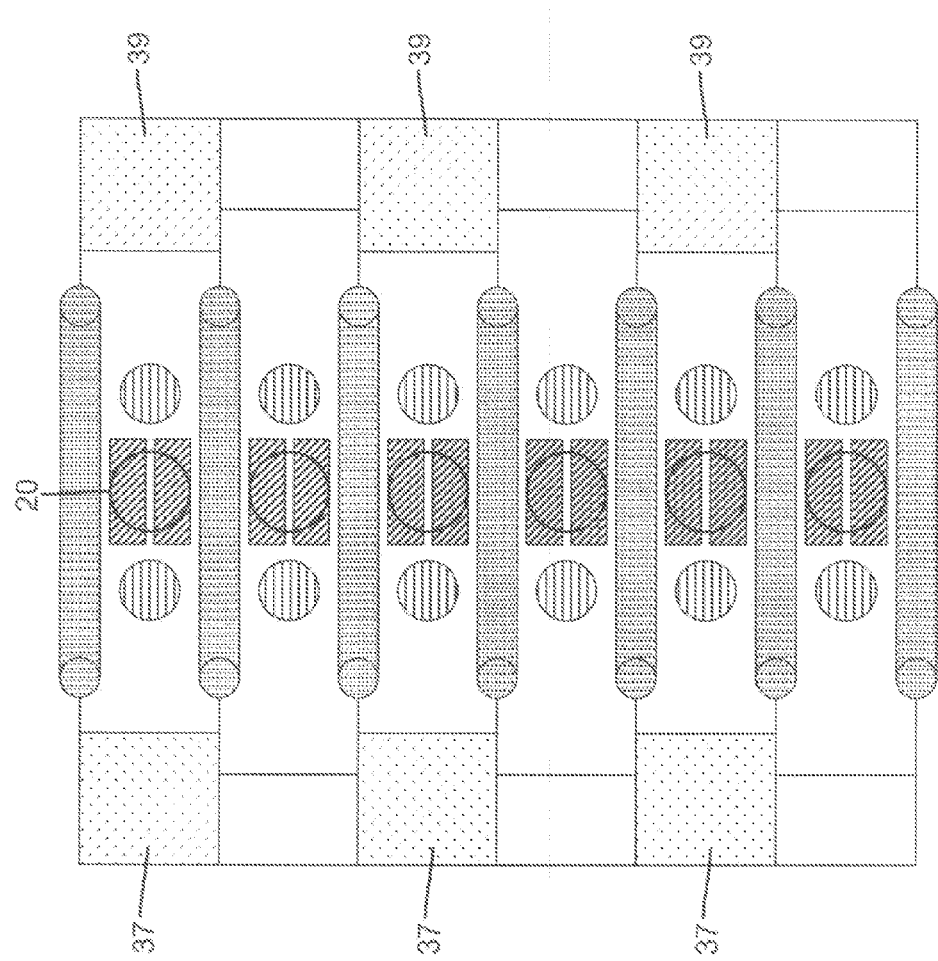
Figure 17:
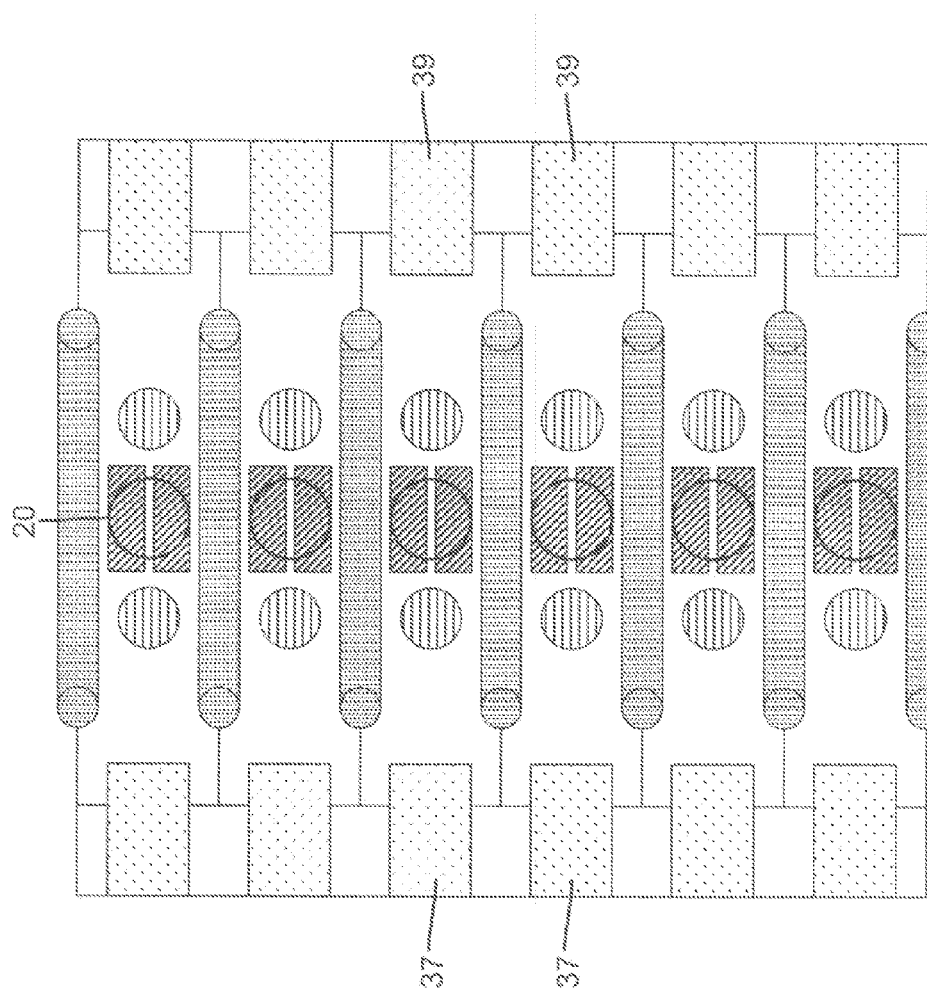

For example in the two embodiments illustrated in FIGS. 15 and 16, there are three segments 37 and three segments 39 of liquid inlet 36, and there are 6 ejectors 20. In other words, for this limited view of the printhead die 18 (and by extension for the entire printhead die 18) the total number of segments of liquid inlet 36 is the same as the number of liquid ejectors 20. Although the electrical leads are not shown in FIGS. 15 and 16, it is clear that the leads could be routed between adjacent segments 39 and/or between adjacent segments 37. In FIGS. 15 and 16 it is also clear that each segment feeds the ejector directly in line with it, as well as the neighboring ejector. In FIG. 15 the segments 37 are offset relative to the segments 39, so that one ejector is directly in line with a segment 39, while the adjacent ejector is directly in line with a segment 37. In FIG. 16, the segments 37 are directly in line with the segments 39, so that one ejector is directly in line with a segment 37 and a segment 39, but the adjacent ejector is offset from its neighboring segments 37 and 39. Lastly, FIG. 17 illustrates an embodiment where there are two inlet segments (one each 37 and 39) for each ejector 20. The inlet segments 37 and 39 are shown as being directly in line with ejectors 20. Such a configuration may be advantageous in situations where the ejector spacing is large enough relative to the manufacturable sizes of inlet segments 37 and 39, as well as to the width and spacing of electrical leads 56.

The invention has been described in detail with particular reference to certain preferred embodiments thereof, but it will be understood that variations and modifications can be effected within the scope of the invention.

PARTS LIST

- 10 liquid ejection system
- 12 data source
- 14 controller
- 16 electrical pulse source
- 18 liquid ejection printhead die
- 20 liquid ejector
- 24 recording medium
- 26 wall
- 28 substrate
- 30 chamber
- 31 nozzle plate
- 32 nozzle orifice
- 33 resistive material
- 34 resistive heating element
- 35 conductive shorting bar
- 36 segmented liquid inlet
- 37 first segment
- 38 first liquid feed channel
- 39 second segment
- 40 second liquid feed channel
- 41 filter post
- 42 liquid flow arrows
- 44 liquid flow arrows
- 46 first segment end
- 48 second segment end
- 50 line relative to first and second segment ends
- 52 post
- 54 indirect liquid supply X
- 56 electrical lead
- 57 via
- 58 printhead die edge
- 59 common lead
- 60 driver transistors
- 62 logic circuitry
- 64 voltage
- 66 segment in central row
- 68 segment in outer row

The invention claimed is:

1. A liquid ejector comprising:
   a structure defining a plurality of chambers, one of the plurality of chambers including a first surface and a second surface, the first surface including a nozzle orifice;
   a drop forming mechanism located on the second surface of the chamber opposite the nozzle orifice;
   a first liquid feed channel and a second liquid feed channel being in fluid communication with the chamber; and a segmented liquid inlet, a first segment of the liquid inlet being in fluid communication with the first liquid feed channel, and a second segment of the liquid inlet being in fluid communication with the second liquid feed channel, the first segment of the liquid inlet also being in fluid communication with another one of the plurality of chambers, the second segment of the liquid inlet also being in fluid communication with another one of the plurality of chambers.

2. The liquid ejector according to claim 1, wherein the first segment of the liquid inlet and the second segment of the liquid inlet are positioned offset relative to each other as viewed from a plane perpendicular to the nozzle orifice.

3. The liquid ejector according to claim 2, the first segment of the liquid inlet having an end adjacent to an end of the second segment of the liquid inlet, wherein the end of the first segment overlaps the end of the second segment.

4. The liquid ejector according to claim 2, the first segment of the liquid inlet having an end adjacent to an end of the second segment of the liquid inlet, wherein the end of the first segment is aligned with the end of the second segment.

5. The liquid ejector according to claim 2, the first segment of the liquid inlet having an end adjacent to an end of the second segment of the liquid inlet, wherein the end of the first segment is spaced apart from the end of the second segment.

6. The liquid ejector according to claim 1, further comprising a post disposed in at least one of the first and second liquid feed channels.

7. The liquid ejector according to claim 1, further comprising a post disposed in each of the first and second liquid feed channels.

8. The liquid ejector according to claim 7, wherein the posts are symmetrically disposed about the nozzle orifice.

9. The liquid ejector according to claim 7, wherein the posts have the same cross sectional area.

10. The liquid ejector according to claim 7, wherein the posts are non-symmetrically disposed about the nozzle orifice.

11. The liquid ejector according to claim 7, wherein the posts have different cross sectional areas.

12. The liquid ejector according to claim 7, further comprising at least one additional post disposed in at least one of the first liquid feed channel and the second liquid feed channel between the nozzle orifice and at least one of the first segment of the liquid inlet and the second segment of the liquid inlet.

13. The liquid ejector according to claim 1, wherein the first and second feed channels extend in opposite directions from the chamber.

14. The liquid ejector according to claim 1, wherein the first segment and the second segment of the liquid inlet are located on opposite sides of the nozzle orifice.

15. The liquid ejector according to claim 1, wherein the another one of the plurality of chambers that is in fluid communication with the first segment of the liquid inlet is the same chamber as the another one of the plurality of chambers that is in fluid communication with the second segment of the liquid inlet.

16. The liquid ejector according to claim 1, wherein for a given chamber of the plurality of chambers one of the first segment of the liquid inlet and the second segment of the liquid inlet is directly in line with the chamber and the other of the first segment of the liquid inlet and the second segment of the liquid inlet is offset from the chamber.

17. A liquid ejector comprising:
a structure defining an array of chambers, each chamber having a nozzle orifice;
a drop forming mechanism located in each chamber;
first and second liquid feed channels being in fluid communication with each chamber, the first and second feed channels extending in opposite directions from each chamber; and
a segmented inlet comprising a plurality of first segments and a plurality of second segments, each of the first segments of the liquid inlet being in fluid communication with the first liquid feed channels, and each of the second segments of the liquid inlet being in fluid communication with the second liquid feed channels, wherein the plurality of first segments and the plurality of second segments are located on opposite sides of the nozzle orifice, and wherein for a given chamber of the array of chambers one of the first segment of the liquid inlet and the second segment of the liquid inlet is directly in line with the chamber and the other of the first segment of the liquid inlet and the second segment of the liquid inlet is offset from the chamber.

18. The liquid ejector according to claim 17, further comprising an electrical lead extending from each drop forming mechanism toward an edge of the structure, wherein at least one of the electrical leads is positioned between neighboring segments of at least one of the plurality of first segments and the plurality of second segments of the liquid inlet.

19. The liquid ejector according to claim 18, further comprising power circuitry including a plurality of drivers, each driver being in electrical communication with a corresponding drop forming mechanism through a corresponding electrical lead.

20. The liquid ejector according to claim 17, further comprising an electrical lead extending from each drop forming mechanism toward an edge of the structure, wherein none of the electrical leads extend toward the plurality of second segments of the liquid inlet.

21. The liquid ejector according to claim 20, wherein at least one of the electrical leads is positioned between neighboring segments of the plurality of first segments of the liquid inlet.

22. The liquid ejector according to claim 20, further comprising power circuitry including a plurality of drivers, each driver being in electrical communication with a corresponding drop forming mechanism through a corresponding electrical lead, wherein each driver is located on a side of the plurality of first segments of the liquid inlet which is opposite a nozzle orifice side of the plurality of first segments of the liquid inlet.

23. The liquid ejector according to claim 17, further comprising an electrical lead extending from each drop forming mechanism toward an edge of the structure, one electrical lead from one of the drop forming mechanisms being electrically connected to another electrical lead from another of the drop forming mechanisms at a location between the nozzle orifice and the segmented inlet.

24. The liquid ejector according to claim 23, the one electrical lead from one of the drop forming mechanisms that is electrically connected to another electrical lead from another of the drop forming mechanisms being a combined electrical lead, the combined electrical lead extending toward the edge of the structure between neighboring segments of at least one of the plurality of first segments and the plurality of second segments of the liquid inlet.

25. The liquid ejector according to claim 17, wherein the array of chambers is a two dimensional array of chambers, each chamber having a nozzle orifice such that a two dimensional array of nozzle orifices is present.

26. The liquid ejector according to claim 25, wherein the nozzle orifices of the two dimensional array of nozzle orifices are staggered relative to each other.

27. The liquid ejector according to claim 25, the segmented inlet further comprising a plurality of third segments, each of the third segments of the liquid inlet being positioned between the nozzle orifices of the two dimensional array of nozzle orifices.

28. The liquid ejector according to claim 27, wherein the nozzle orifices of the two dimensional array of nozzle orifices are staggered relative to each other.

29. The liquid ejector according to claim 28, further comprising an electrical lead extending from each drop forming mechanism toward an edge of the structure, wherein at least one of the electrical leads is positioned between neighboring segments of at least one of the plurality of first segments and the plurality of second segments of the liquid inlet.

30. The liquid ejector according to claim 29, further comprising power circuitry including a plurality of drivers, each driver being in electrical communication with a corresponding drop forming mechanism through a corresponding electrical lead.

31. The liquid ejector according to claim 30, wherein each driver is located on a side of the plurality of first segments or the plurality of second segments of the liquid inlet which is opposite a nozzle orifice side of the plurality of first segments or the plurality of second segments of the liquid inlet.

32. The liquid ejector according to claim 27, wherein the nozzle orifices of the two dimensional array of nozzle orifices are aligned relative to each other.

33. The liquid ejector according to claim 27, each of the plurality of third segments of the liquid inlet having a cross sectional area that is larger than a cross sectional area of each of the plurality of first segments and each of the plurality of second segments, the cross sectional area being viewed from a plane perpendicular to the nozzle orifices.

34. The liquid ejector according to claim 25, the nozzle orifices of one portion of the two dimensional nozzle orifice array have a cross sectional area that is different from a cross sectional area of nozzle orifices of another portion of the two dimensional nozzle orifice array, the cross sectional area being viewed from a plane perpendicular to the nozzle orifices.

35. The liquid ejector according to claim 17, wherein each of the plurality of first segments of the liquid inlet are positioned offset relative to each of the plurality of second segments of the liquid inlet.

36. The liquid ejector according to claim 17, wherein each of the plurality of first segments of the liquid inlet are positioned aligned relative to each of the plurality of second segments of the liquid inlet.

37. The liquid ejector according to claim 17, wherein the liquid ejector satisfies the following condition: $N<2(M_1+M_2)$, where N is the total number of chambers, $M_1$ is the total number of first segments, and $M_2$ is the total number of second segments.

38. A liquid ejector comprising:
a structure defining an array of chambers, each chamber having a nozzle orifice;
a drop forming mechanism located in each chamber;
first and second liquid feed channels being in fluid communication with each chamber, the first and second feed channels extending in opposite directions from each chamber; and
a segmented inlet comprising a plurality of first segments and a plurality of second segments, each of the first segments of the liquid inlet being in fluid communication with the first liquid feed channels, and each of the second segments of the liquid inlet being in fluid communication with the second liquid feed channels, wherein the plurality of first segments and the plurality of second segments are located on opposite sides of the nozzle orifice, wherein the liquid ejector satisfies the following condition: $N \geq 2(M_1+M_2)$, where N is the total number of chambers, $M_1$ is the total number of first segments, and $M_2$ is the total number of second segments.

39. A liquid ejector comprising:
a structure defining a plurality of chambers, each of the chambers having a nozzle orifice;
a drop forming mechanism located in each chamber;
first and second liquid feed channels being in fluid communication with each chamber; and
a segmented inlet, a first segment of the liquid inlet being in fluid communication with the first liquid feed channel in fluid communication with one of the chambers, and a second segment of the liquid inlet being in fluid communication with the second liquid feed channel in fluid communication with one of the chambers, the first segment of the liquid inlet and the second segment of the liquid inlet being positioned offset relative to each other as viewed from a plane perpendicular to the nozzle orifice such that for a given chamber of the plurality of chambers one of the first segment of the liquid inlet and the second segment of the liquid inlet is directly in line with the chamber and the other of the first segment of the liquid inlet and the second segment of the liquid inlet is offset from the chamber, the first segment of the liquid inlet also being in fluid communication with another one of the plurality of chambers, the second segment of the liquid inlet also being in fluid communication with another one of the plurality of chambers.

* * * * *